United States Patent
Trowbridge et al.

(10) Patent No.: US 12,462,689 B2
(45) Date of Patent: Nov. 4, 2025

(54) METHOD FOR HEAVY TRUCK PLATOONING ORDER ON WET ROADS USING TIRE TREAD VOLUMETRIC VOID PERCENTAGE

(71) Applicant: COMPAGNIE GENERALE DES ETABLISSEMENTS MICHELIN, Clermont-Ferrand (FR)

(72) Inventors: Jeremy Trowbridge, Greenville, SC (US); Gurkan Erdogan, Greer, SC (US); Robert Ciprian Radulescu, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 300 days.

(21) Appl. No.: 18/249,272

(22) PCT Filed: Nov. 12, 2020

(86) PCT No.: PCT/US2020/060115
§ 371 (c)(1),
(2) Date: Apr. 17, 2023

(87) PCT Pub. No.: WO2022/103392
PCT Pub. Date: May 19, 2022

(65) Prior Publication Data
US 2023/0394976 A1 Dec. 7, 2023

(51) Int. Cl.
*G08G 1/00* (2006.01)
*B60C 11/03* (2006.01)

(52) U.S. Cl.
CPC .............. *G08G 1/22* (2013.01); *B60C 11/033* (2013.01); *B60C 2200/06* (2013.01)

(58) Field of Classification Search
CPC .............. B60C 11/033; B60C 2200/06; B60T 2240/00; B60T 7/18; B60T 7/20; B60T 8/1708; G08G 1/22
See application file for complete search history.

(56) References Cited

U.S. PATENT DOCUMENTS

2009/0320581 A1* 12/2009 Angell .................. G01B 11/22
73/146
2016/0297248 A1 10/2016 Warfford et al.
(Continued)

FOREIGN PATENT DOCUMENTS

WO 2018043753 A1 3/2018
WO WO-2019122695 A1 * 6/2019 .......... B60W 40/064

OTHER PUBLICATIONS

Machine Translation of WO 2019122695 A1 obtained from Clarivate Analytics on May 2, 2025 (Year: 2019).*

(Continued)

*Primary Examiner* — Naeem Taslim Alam
*Assistant Examiner* — Michael J Herrera
(74) *Attorney, Agent, or Firm* — Neal P. Pierotti

(57) ABSTRACT

A method for platooning tractor trailers (12, 20) is provided in which tread volumetric void percentages of first tractor tires (18) and second tractor tires (26) are determined. These tread volumetric void percentages are weighted at a ratio of at least 80/20 steer/drive and are used to determine tread volumetric void percentages of the first and second tractor trailers (12, 20). The first and second tractor trailers (12, 20) are positioned in a platoon (10) so that the one of the first and second tractor trailer (12, 20) that has the lower tread volumetric void percentage is positioned in front of the other of the first or second tractor trailers (12, 20) so long as a (Continued)

difference of at least 7% is present between the tread volumetric void percentages of the first and second tractor trailers (12, 20).

15 Claims, 3 Drawing Sheets

(56) References Cited

U.S. PATENT DOCUMENTS

| | | | | |
|---|---|---|---|---|
| 2017/0349007 | A1* | 12/2017 | Wei | G01B 11/22 |
| 2018/0188746 | A1 | 7/2018 | Lesher et al. | |
| 2019/0196501 | A1* | 6/2019 | Lesher | G05D 1/0293 |
| 2020/0027355 | A1 | 1/2020 | Sujan et al. | |
| 2020/0126330 | A1* | 4/2020 | Wofford-Redmond | B60C 11/246 |
| 2020/0160723 | A1 | 5/2020 | Switkes et al. | |
| 2020/0388164 | A1 | 12/2020 | Domprobst et al. | |

OTHER PUBLICATIONS

European Patent Office, International Search Report dated Jun. 10, 2021, pp. 1-13 (included), European Patent Office, Rijswijk, The Netherlands.

\* cited by examiner

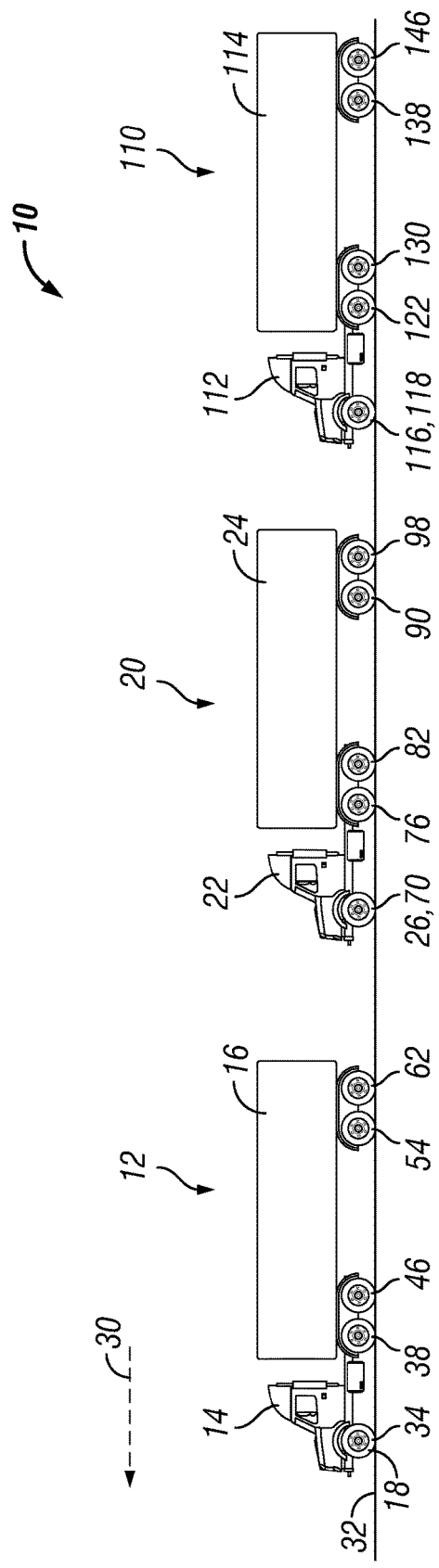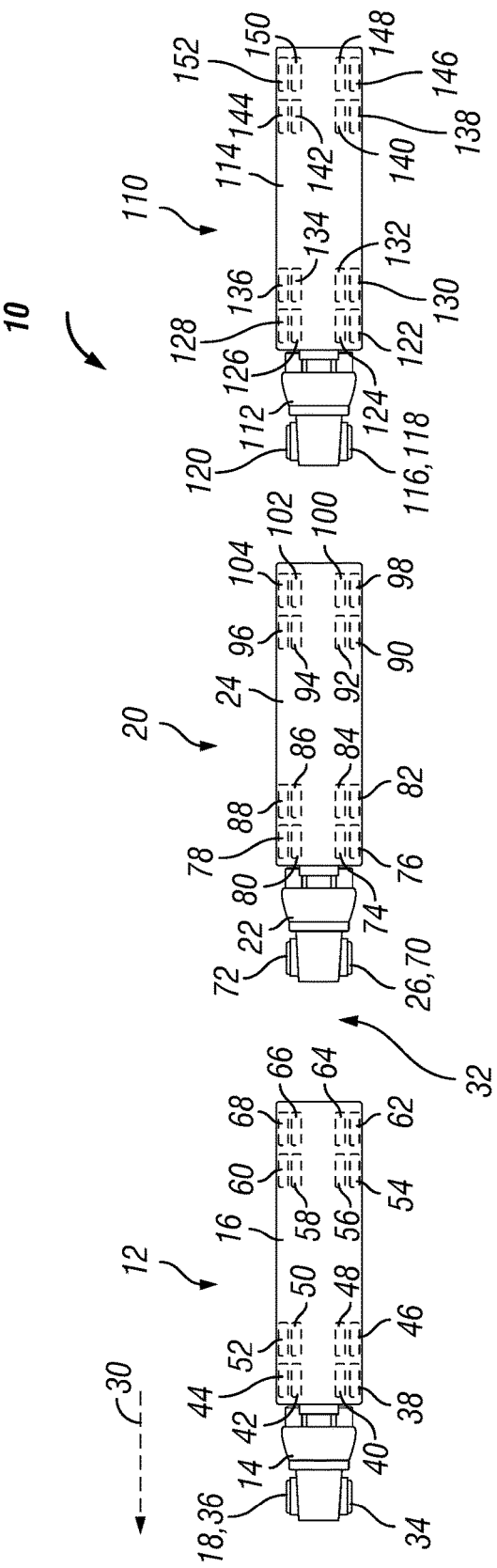

METHOD FOR HEAVY TRUCK PLATOONING ORDER ON WET ROADS USING TIRE TREAD VOLUMETRIC VOID PERCENTAGE

STATEMENT REGARDING FEDERALLY SPONSORED RESEARCH OR DEVELOPMENT

This invention was made with government support under grant DE-EE0008469 awarded by the US Department of Energy. The Federal government has certain rights in the invention.

CROSS-REFERENCE TO RELATED APPLICATIONS

The present application is a 35 U.S.C. § 371 application of PCT/US2020/060115 filed on Nov. 12, 2020 and entitled "Method for Heavy Truck Platooning Order on Wet Roads Using Tire Tread Volumetric Void Percentage" and claims benefit thereto. The entire contents of PCT/US2020/060115 are incorporated by reference herein in their entirety for all purposes.

FIELD OF THE INVENTION

The subject matter of the present invention relates to specifying the platooning order of heavy trucks when running on wet roads based upon an average amount of tread volumetric void of their tire treads. More particularly, the present application involves a platooning operation method for wet surface conditions in which the tread volumetric void percentage of the tires fitting the platoon tractor trailer units are used to establish the platooning order.

BACKGROUND OF THE INVENTION

Platooning is the linking of two or more tractor trailers in a convoy as they travel down the road through the use of vehicle to vehicle (V2V) communication technologies and driver assistance systems. These technologies and assistance systems allow tractor-trailers to follow each other safely at a close distance and benefit from the improved aerodynamics of the formed convoy, improvements that in turn lead to fuel savings for all the units within the platoon.

Platooning systems vary in the communication technology and driver support systems they use. In some instances of platooning, the tractor trailers all communicate with one another and include sensors that allow them to know how close one tractor trailer is from the other in sequence in the convoy. With respect to the driver support systems, they may include driverless technology that manages the distance between the successive tractor trailers. This driverless technology can automatically increase or decrease the distance between successive tractor trailers, can automatically brake the tractor trailers should the need arise, and may steer or otherwise automatically drive the tractor trailers. Any or all of these various features can be employed in different platooning arrangements.

The platoon needs to be capable of interacting with other traffic on the roadway. For example, should a car break into the platoon by changing lanes so as to be between two successive tractor trailers, the platooning system can react by sensing the presence of this car and then adjusting the distance between the tractor trailers rearward from this car and possibly increasing the distance of those forward of this car. Also, should a car suddenly stop in front of the lead tractor trailer, or should any other situation occur requiring sudden stopping, the platooning system may react to automatically brake the tractor trailers. Sudden stopping of a convoy of tractor trailers should be executed in a manner that prevents tailing tractor trailers from crashing into those that are forward. Stopping distance can be effected by a number of variables such as the brake system on the tractor trailer, the type of tires and whether they are or are not damaged or worn, the weight of the tractor and trailer coupled with the weight or positioning of cargo transported within the trailer, the driver reaction, the road conditions, and whether the tractor trailer is equipped with automatic stopping technology. Due to the variables associated with stopping distances of tractor trailers in platoons, platoons are only run on dry pavement and not in the rain on wet road surfaces. Wet roadways may be those in which enough water is present on the roadway so that drainage is not effective and water pools on the road. Platoons are not run on wet road surfaces or in heavy rain because of hydroplaning and because stopping ability is different between the various tractor trailers when running in dry conditions. There is no present protocol for selecting tractor trailer order in wet conditions. A system for running platoons in wet road conditions does not exist and would expand the utilization of platooning on the roadways.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a platoon.

FIG. 2 is top view of the platoon of FIG. 1.

The use of identical or similar reference numerals in different figures denotes identical or similar features.

DETAILED DESCRIPTION OF THE INVENTION

Figure 3:
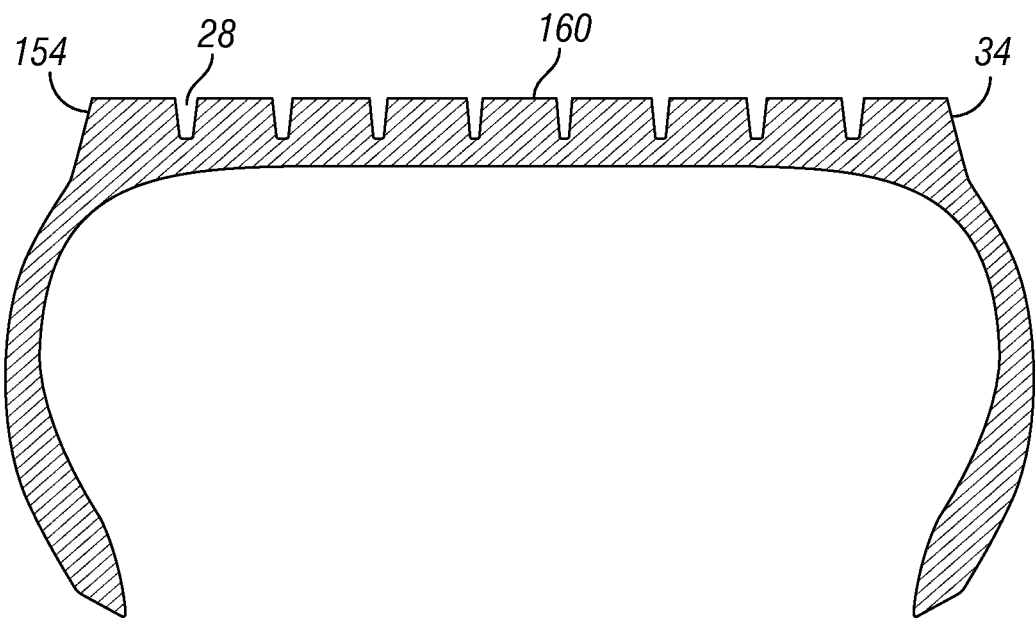
FIG. 3 is cross-sectional view of a tire in an unworn state.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a method of establishing a platooning order of tractor trailers 12, 20, 110 in a platoon when driving in wet conditions. The method is executed by determining the tread volumetric void percentages of tires of the tractors 14, 22, 112 of the tractor trailers 12, 20, 110. At least one steer tire and at least one drive tire of the tractors 14, 22, 112 are considered. If more than one steer tire is considered then the average of the plurality is determined, and if more than one drive tire is considered then the average of the tread volumetric void percentage is calculated. Once this is determined, a weighting is performed such that the steer and drive tires are weighted against one another. The weighting is at least 80/20 steer/ drive so that the average of the tread volumetric void percentage of the steer tires is multiplied by 0.80, and the average of the tread volumetric void percentage of the drive tires is multiplied by 0.20, and these numbers are added together to result in the volumetric void percentage of the tractor trailer 12, 20, 110 in question. The tractor trailers 12, 20, 110 are ordered in position in the platoon based upon the tread volumetric void percentages of the tractor trailers 12, 20, 110 once a certain threshold of difference in tread volumetric void percentages is reached. In this regard, the tractor trailer 12, 20, 110 with the highest tread volumetric void percentage is placed last in the platoon, the tractor trailer 12, 20, 110 with the next highest tread volumetric void percentage is placed before that one, and so forth until the lead tractor trailer 12, 20, 110 in the platoon is the one that has the tires with the lowest tread volumetric void percentage. The platooning order is thus based upon this variable of the tires of the tractors 14, 22, 112, and the platooning method disclosed herein is for platooning in wet conditions and not for dry conditions.

FIG. 1 shows a platoon 10 that includes three tractor trailers 12, 20, 110 that all include tires which are heavy duty truck tires. In this regard, the tires described herein are not designed for nor used with a car, motorcycle, or light truck (payload capacity less than 4,000 pounds), but are instead designed for and used with heavy duty trucks such as 18 wheelers, garbage trucks, or box trucks. The tire includes a casing onto which a tread is disposed thereon. The tread can be manufactured with the casing and formed as a new tire, or the tread can be a retread band that is attached to the casing at some point after the casing has already been used to form a retreaded tire. A first tractor trailer 12 is shown in the lead position in the platoon 10 and is the first vehicle in the group moving forward in the platoon forward direction of travel 30 on the ground 32, which is generally an asphalt or concrete road surface. The first tractor trailer 12 includes a first tractor 14 that is attached to and pulls a first trailer 16 that is filled with cargo. The first tractor 14 is the portion of the unit that includes the engine, and the first trailer 16 is the portion of the unit that includes the cargo that is desired to be transported. The first tractor trailer 12 is sometimes referred to as a semi-trailer truck, a tractor trailer, an eighteen wheeler (referring to the number of tires on the entire unit), a transport truck, or various other names Although shown as being a single first trailer 16, the first trailer 16 can be made of two or three trailers in other embodiments.

Tractor trailers include three different types of tires known as steer tires, drive tires, and trailer tires. These three different tire types are designed for optimum use depending upon the position they occupy in the tractor trailer unit due to different needs at these different positions. Some truck tires can be designed as all position tires and may be placed at any position on the tractor trailer. With reference to FIGS. 1 and 2, the first tractor trailer 12 has a first tractor 14 that has a pair of steer tires 34, 36 located at the very front of the first tractor trailer 12 that function to help turn the first tractor trailer 12 in a left or right direction. The first tractor 14 also has eight drive tires toward the back end of the first tractor 14 that receive rotational motion to in turn drive the first tractor trailer 12 forward in the platoon forward direction of travel 30. The drive tires are tires 38, 40, 42, 44, 46, 48, 50 and 52. It is the case that drive tires 38, 40, 42 and 44 are on one axle, and that drive tires 46, 48, 50 and 52 are on a separate rearward axle. Although dual drive tires are shown, in other embodiments a single drive tire can be substituted for the dual set 38 and 40, the dual set 42 and 44, the dual set 46 and 48, and the dual set 50 and 52. The steer and drive tires 34, 36, 38, 40, 42, 44, 46, 48, 50 and 52 make up the tractor tires of the first tractor 14 because these tires are all located on the first tractor 14. As shown in FIGS. 1 and 2, the first trailer 16 extends over the top of the drive tires 38, 40, 42, 44, 46, 48, 50 and 52 but is connected to the first tractor 14 and does not have these drive tires located thereon.

The first tractor trailer 12 also has a set of trailer tires, and these trailer tires are all located on the first trailer 16 and not the first tractor 14. There are eight trailer tires and are denoted by reference numbers 54, 56, 58, 60, 62, 64, 66 and 68. Again, although dual trailer tires are shown, single trailer tires may be used in place of the dual set 54 and 56, dual set 58 and 60, dual set 62 and 64, and dual set 66 and 68. The trailer tires are located on the back end of the first trailer 16 in the forward direction of travel 30 and function to support the loaded first trailer 16 during transport.

The first tractor trailer 12 has a plurality of first tractor tires 18 that are tires of the first tractor 14 and are not tires of the first trailer 16. The plurality of first tractor tires 18 can be any two or more of the tires of the first tractor 14. The plurality of first tractor tires 18 may be all of the steer tires 34 and 36 in one embodiment. In another embodiment, the plurality of first tractor tires 18 may be all of the drive tires 38, 40, 42, 44, 46, 48, 50 and 52. In yet another embodiment, the plurality of first tractor tires 18 may be all of the tires 34, 36, 38, 40, 42, 44, 46, 48, 50 and 52 of the first tractor 14. In accordance with another exemplary embodiment, the plurality of drive tires 18 are a combination of the steer and drive tires of the first tractor 14, and may be tires 34, 40, 44 and 46. Although shown has having eighteen tires, it is to be understood that the first tractor trailer 12 may have fewer than eighteen tires in accordance with other exemplary embodiments.

Turning now to the second tractor trailer 20, it is immediately behind the first tractor trailer 12 in the platoon 10 in the platoon forward direction of travel 30. The second tractor trailer 20 can be configured in a similar manner to the first tractor trailer 12 with respect to the tires and can have eighteen tires or greater or less in various embodiments. The second tractor trailer 20 has a second tractor 22 that carries the steer and drive tires, and an attached second trailer 24 hauled by the second tractor 22 that includes the trailer tires of the second tractor trailer 20. The steer tires on the second tractor 22 are tires 70 and 72. The drive tires of the second tractor 22 are tires 74, 76, 78, 80, 82, 84, 86 and 88. The trailer tires of the second trailer 24 are tires 90, 92, 94, 96, 98, 100, 102 and 104. The tractor tires of the second tractor trailer 20 are tires of the second tractor 22 and are not any of the tires of the second trailer 24.

The second tractor trailer 20 has a plurality of second tractor tires 26 that are only tires of the second tractor 22 and not the second trailer 24. The plurality of second tractor tires 26 can be all of the steer tires 70 and 72, can be all of the drive tires 74, 76, 78, 80, 82, 84, 86 and 88, or could be all of the tires 70, 72, 74, 76, 78, 80, 82, 84, 86 and 88 of the second tractor 22. In other embodiments, the plurality of second tractor tires 26 may be any combination of the steer or drive tires and in one embodiment is tires 70, 78 and 82.

The platoon 10 can include any plurality of tractor trailers. In the embodiment shown in FIGS. 1 and 2, there are three tractor trailers 12, 20 and 110. The third tractor trailer 110 is located immediately behind the second tractor trailer 20 in the platoon forward direction of travel 30. In the three tractor trailer platoon 10, the third tractor trailer 110 is the last tractor trailer in the platoon 10 and can have eighteen tires like the rest of the tractor trailers 12, 20 in the platoon 10, or may have more or fewer tires than eighteen. The third tractor trailer 110 has a third tractor 112 that hauls a third trailer 114. The third tractor 112 includes steer tires 118 and 120, and includes a number of drive tires 122, 124, 126, 128, 130, 132, 134 and 136. The third trailer 114 has the trailer tires 138, 140, 142, 144, 146, 148, 150 and 152. A plurality of third tractor tires 116 are present and are tires of the third tractor 112 but are not tires of the third trailer 114. The third tractor tires 116 can be all of the steer tires 118 and 120, can be all of the drive tires 122, 124, 126, 128, 130, 132, 134 and 136, or may be all of the third tractor 112 tires 118, 120, 122, 124, 126, 128, 130, 132, 134 and 136. The plurality of third tractor tires 116 can be any combination of these tires such as being tire 122, 126, 134 and 136.

Figure 4:
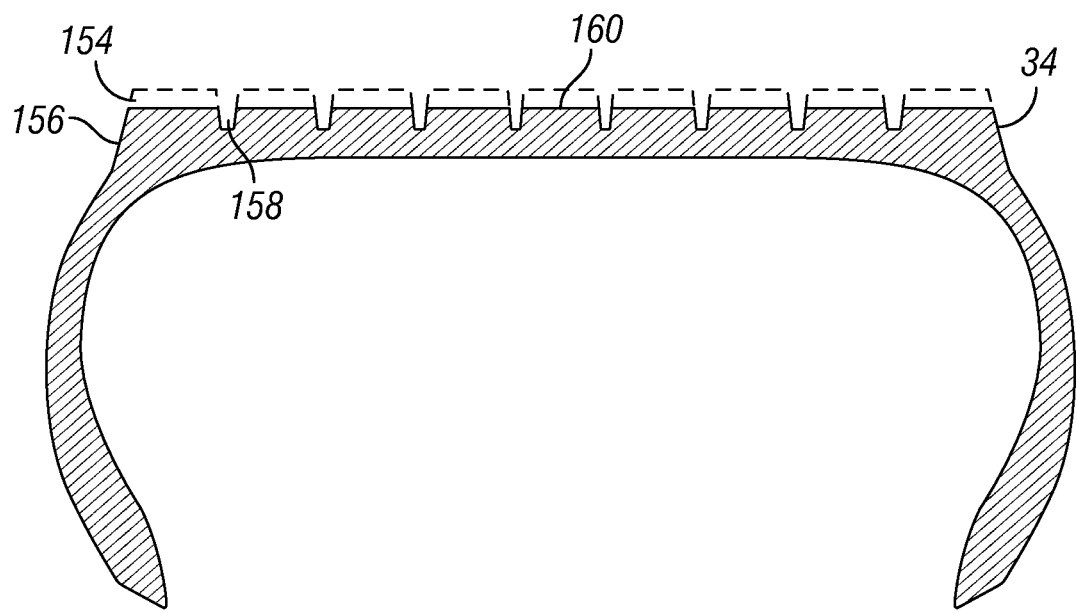
FIG. 4 is a cross-sectional view of the tire of FIG. 3 in a worn state.

FIGS. 3 and 4 show one of the steer tires 34 of the first tractor 14 of the first tractor trailer 12 in cross-sectional view. For purposes of explanation, the tire 34 is shown but it is to be understood that the tire 34 described with reference to FIGS. 3 and 4 could be any of the aforementioned tires 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 120, 122, 124, 126, 128, 130, 132, 134, 136, 138, 140, 142, 144, 146, 148, 150 and 152. The tire 34 is described for sake of convenience and the following description is applicable to any of the other tires of the various tractor trailer 12, 20, 110 of the platoon 10. The tire 34 is shown in an unworn state 154 in FIG. 3. The unworn state 154 represents the condition of the tread 160 before being put onto the wheel of the first tractor 14 and driven so that some of the tread 160 is removed through driving. The unworn states 154 may be present either in a brand new tire 34 that was just produced or a retread tire onto which the tread 160 was placed and is brand new before being driven on the wheel of the first tractor 14.

The tread 160 has a geometry that includes a series of grooves, sipes, ribs, and tread blocks that provide different functionality to the performance of the tire. The tread 160 in a more general sense is made up of rubber with a series of voids, which could be the aforementioned grooves and sipes. The tire 34 has a tread volumetric void 28 that is the total amount of void present in the tread 160. The tread volumetric void 28 can be distinguished from a surface void of the tire 34 which would be an area of void at the surface of the tread 160. The tread volumetric void 28 thus includes void that extends in the thickness direction of the tread 160. The tread volumetric void 28 can include hidden grooves and sipes within the tread 160 that are not visible from the surface of the tread 160. The tread volumetric void 28 can be expressed in terms of volume such as in cubic millimeters.

After the tire 34 has been driven for some amount of time the tread 160 begins to wear down. FIG. 4 shows the tire 34 of FIG. 3 in a worn state 156 in which some but not all of the tread 160 has been removed due to driving. The tread 160 in the worn state 156 still has some of its tread life remaining as shown, but in other embodiments the tread 160 may be worn all the way down to where it will require replacement. In the worn state 156, the tire 34 has a tread volumetric void 158 that is the total amount of void in the tread 160 of the tire 34. Again, the tread volumetric void 158 is a volume and can be expressed in units of cubic millimeters. Since some of the tread 160 has been removed in the worn state 156 it will necessarily be the case that the tread volumetric void 158 will be less than the tread volumetric void 28 of the tire 34 in the unworn state 154. For reference purposes, the unworn state 154 is shown in dashed lines in FIG. 4 to show how much the tread 160 has worn from the unworn state 154 of FIG. 3 to the worn state 156 of FIG. 4. The tread volumetric void 28, 158 can be determined by measuring the amount of void present in the tread 160. This can be done by physically measuring the tread 160 or may be done by using a computer drafting program that has a solid model of the tread 160 that can output this information.

The tread volumetric void percentage of the tire 34 may be determined by different methods. One method involves using the tread volumetric voids 28, 158 previously discussed. The tread volumetric void percentage can be determined by calculating the percentage difference between the tread volumetric void 28 and the tread volumetric void 158. As an example, should the tread volumetric void 28 be measured to be 500 mm$^3$ and the tread volumetric void 158 be determined to be 150 mm$^3$, then the tread volumetric void percentage may be calculated as 150 mm$^3$/500 mm 3=30%. This 30% is the tread volumetric void percentage of the tire 34 in the worn state 156 of the tire as compared to the state of the tire 34 in the unworn state 154. Should the tire 34 be completely worn down so that no void is left, then the tread volumetric void percentage would be 0 mm$^3$/500 mm 3=0%.

One method to calculate the tread volumetric void percentage of the tire is to use the current void volume of the tire and divide it by the baseline "total void volume" of the tire. The total void volume, which can be expressed in cubic millimeters, of the new, unworn, tire is the baseline "total tread void volume" for the tire. As the tire wears its total void volume decreases. The current tread void volume is the tread void volume of the tire at any instant in time. A new tire therefore has a tread volumetric void percentage of 100%.

Another method of calculating the tread volumetric void percentage of the tire 34 could be through measurement of the wear of the tire 34. In this instance, the tread volumetric void percentage could either be a completely accurate measurement or a measurement that does have an element of measurement error associated with it. The grooves, sipes, and other voids in the tread 160 can be wavy in extension in the depth direction of the tread 160, can be hidden under portions of the tread 160, or can expand or contract in width upon extension in the depth direction. In such instances, the surface void of the tread 160 of the tread is different depending upon what depth you are at within the tread 160. Stated another way, the void amount is not consistent from the unworn state 154 to the worn state 156 so that a linear relationship between tread 160 wear and tread volumetric void is not present. In other embodiments, the tread 160 does have a linear relationship between wear and tread volumetric void, and when these tread 160 designs wear a corresponding amount of tread volumetric void would likewise be lost. Regardless of whether a linear relationship does or does not exist, the tread volumetric void percentage may be determined by measuring the amount of wear the tread 160 has experienced. For example, if the depth of the tread 160 in the unworn state 154 is 20 mm and the depth of the tread is 6 mm in the worn state of the tire 156 then the tread volumetric void percentage is 6 mm/20 mm=30%. A new tire 34 would have a tread volumetric void percentage of 100%, and a tire 34 that is completely worn down would have a tread volumetric void percentage of 0% as measured by the wear method. The depth of the tread 160 in the unworn state 154 is the depth of the tread 160 with a new tire 34 or a newly retreaded tire 34 representing the full tread depth of the tread 160 before it is completely worn and needs to be replaced. This tread volumetric void percentage 30% may be completely accurate in the case where the tread volumetric void does not vary upon wear of the tread 160, or may be an estimate of the tread volumetric void in designs of the tread 160 in which the tread volumetric void does not have a linear relationship with the tread depth. As such, using the depth of the tread 160 is an alternate way, or additional way, to determine the tread volumetric void percentage of the tire 34 to or along with measurements using the tread volumetric void.

The platooning method thus utilizes only the tread volumetric void percentage of the tires in order to determine the position of the tractor trailers 12, 20, 110 and does not take into account other stopping variables such as brake system, loading, tire pressure, tractor choice, trailer choice, or type of tire. Further, only the tires of the tractors 14, 22, 112 are evaluated for the positioning of the tractor trailers 12, 20, 110 and the tires of the trailers 16, 24, 114 are not even considered when setting the order of tractor trailers 12, 20, 110. Once the tread volumetric void percentages are known, an average tread volumetric void percentage can be calculated in order to make the decision as to the order of the tractor trailers 12, 20, 110 in the platoon 10. Applicant has discovered that the steer tires 34, 36 have a higher impact on wet braking results than do the drive tires 38, 40, 42, 44, 46, 48, 52 of the tractor trailer 12. This is true for the steer and drive tires of the other tractor trailers 20, 110 as well. For this reason, the method employs a weighing factor in which the steer tires 34, 36 are weighted more heavily than the drive tires 38, 40, 42, 44, 46, 48, 52 due to the steer tires' tread volumetric void volume percentage having a larger impact on wet braking results.

The weighing factor between steer and drive tires is at least 80/20 but may be as high as 100/0, and in some embodiments is 95/5. In this regard, the steer tires 34, 36 are weighted at least 80% while the drive tires 38, 40, 42, 44, 46, 48, 50, 52 are weighted no more than 20%. The weighting of the tread volumetric void percentages of the steer and drive tires can take place after their averaging. The method uses the tread volumetric void percentage of at least one of the steer tires 34 or 36, and at least one of the drive tires 38, 42, 44, 46, 48, 50 and 52. In other embodiments all of the steer and drive tires are used to determine the tread volumetric void percentages.

As one example, should the first tractor trailer 12 have a plurality of tires 34, 36, 38, 44, 46, 52 with tread volumetric void percentages of 44%, 47%, 48%, 75%, 62%, and 30%, and the weighting is set at a ratio of 80/20, then the tread volumetric void percentage of the first tractor trailer 12 is (0.8*(44+47)/2)+(0.2*(48+75+62+30)/4)=0.8*(45.5)+0.2*(53.75)=(36.4+10.75)=47.15%. The tread volumetric void percentages of the second tractor trailer 20 tires 72, 76, 80, 82 may be 42%, 40%, 60% and 58% so that the weighted tread volumetric void percentage of the second tractor trailer 20 is 0.8*(42)+0.2*(40+60+58)/3)=0.8*(42)+0.2*(52.66)=33.6+10.53=44.13%. The weighted tread volumetric void percentages of the plurality of third tractor 112 tires 120, 122, 124, 134 and 136 may be 20%, 50%, 88%, 81%, and 86% which would yield an average tread volumetric void percentage of 0.8*(20)+0.2*(50+88+81+86)/4=0.8*(20)+0.2*(76.25)=16+15.25=31.25%. (The order of the tractor trailers 12, 20, 110 in the platoon 10 can be set on the wet road surface so that the tractor trailer with the smallest tread volumetric void percentage is first in the platoon 10 in the platoon forward direction of travel 30 and it is 31.25%. The immediately successive tractor trailer will be the one that has the next successively larger tread volumetric void percentage which is 44.13% and is the second tractor trailer 20. The last tractor trailer in the platoon 10 in the forward direction of travel 30 is the tractor trailer that has the greatest average tread volumetric void percentage which is 47.15% and is the first tractor trailer 12. The order of the tractor trailers 110, 20, 12 is thus based completely on the tread volumetric void percentages, and the platoon 10 is best suited for running in wet road conditions such as in heavy rain or when sufficient water is on the road which could cause hydroplaning of the tractor trailers 12, 20, 110. As platoons 10 are not run in wet road conditions, the present method allows the platoon 10 to improve fuel efficiency by allowing the trailing tractor trailers 20, 12 to run closer in wet conditions. The present method thus produces a tangible result of a platoon 10 that achieves better fuel efficiency for the convoy of tractor trailers 12, 20, 110.

Another embodiment of the platooning method is now presented in which the steer/drive weighting is 95/5 steer to drive. This 95/5 weighting was set based upon data obtained from on track testing to date. This embodiment is similar to the 80/20 weighting described above such that 95 would be used in place of 80 and 5 would be used in place of 20. For example, should the first tractor trailer 12 have a plurality of tires 34, 36, 38, 44, 46, 52 with tread volumetric void percentages of 44%, 47%, 48%, 75%, 62% and 30% then the weighted tread volumetric void percentage of the first tractor trailer 12 is (0.95*(44+47)/2)+0.05*(48+75+62+30)/4)=(0.95*(45.50)+0.05*(53.75)=(43.23+2.69)=45.91%. The tread volumetric void percentages of the second tractor trailer 20 tires 72, 76, 80, 82 may be 42%, 40%, 60% and 58% so that the weighted tread volumetric void percentage of the second tractor trailer 20 is (0.95*(42)+0.05*(40+60+58)/3)=(39.90+2.63)=42.53%. The tread volumetric void percentages of the plurality of third tractor 112 tires 120, 122, 124, 134 and 136 may be 20%, 50%, 88%, 81%, and 86% which would yield a weighted tread volumetric void percentage of (0.95*20+0.05*(50+88+81+86)/4)=(19+3.8125)=22.81%. The order of the tractor trailers 12, 20, 110 in the platoon 10 is still set so that the tractor trailer with the smallest weighted tread volumetric void percentage is first in the platoon 10 in the platoon forward direction of travel 30 and it is 22.81%. The immediately successive tractor trailer will be the one that has the next successively larger weighted tread volumetric void percentage which is 42.53% and is the second tractor trailer 20. The last tractor trailer in the platoon 10 in the forward direction of travel 30 is the tractor trailer that has the greatest average tread volumetric void percentage which is 45.91% and is the first tractor trailer 12. The new order of the tractor trailers 110, 20, 12 is thus based completely on the weighted tread volumetric void percentages, and the platoon 10 is now best suited for running in wet road conditions such as in heavy rain or when sufficient water is on the road which could cause hydroplaning of the tractor trailers 12, 20, 110.

The method can be employed in some embodiments only when the tread volumetric void percentage of the plurality of first tractor tires 18 is 87.5% or less and when the tread volumetric void percentage of the plurality of second tractor tires 26 is 87.5% or less. This may be because the effect of tread volumetric void on stopping distance becomes the driving factor once sufficient tire wear and/or tread volumetric void reduction has occurred.

Although described as positioning the tractor trailers 12, 20, 110 based upon the tread volumetric void percentage, embodiments exist in which the order of the tractor trailers 12, 20, 110 is not adjusted until a sufficient amount of difference between the tread volumetric void percentages is present. In this regard, the platoon 10 of tractor trailers 12, 20, 110 can be ordered based upon various criteria for running on dry road surfaces, and such criteria is not within the scope of the present application. Once ordered, the present system allows the platoon 10 to continue to run in wet road conditions by ordering them via tread volumetric void percentages as current platooning arrangements do not allow running in wet road conditions. The tread volumetric void percentages can be determined for each of the tractor trailers 12, 20, 110 as previously discussed, but the order is adjusted from the dry platooning order already established only if the tread volumetric void percentages is greater than a certain threshold. This threshold can be 7% in some embodiments, and 10% in other embodiments. For example, if the platooning order 10 for dry road conditions is established so that the first tractor trailer 12 is first, the second tractor trailer 20 is second, and the third tractor trailer 110 is third, the tread volumetric void percentages are calculated and the order is adjusted only if the threshold is exceeded, and in this example that threshold is 7%. If the tread volumetric void percentage of the first tractor trailer 12 is 60%, the second tractor trailer 20 is 40%, and the third tractor trailer 57% then the position in the platoon of the first and second tractor trailers 12, 20 is switched because the 20% difference between these two is greater than 7%. The first tractor trailer 12 will now be second in the platoon 10 but it will not switch positions with the third tractor trailer 110 because even though it has a higher tread volumetric void percentage the difference is only 3% which is not over the 7% threshold. As such, in this example the wet road condition platoon 10 will have the second tractor trailer 20 first, the first tractor trailer 12 second, and the third tractor trailer 110 last. The platooning system is a wet platooning system in that it reorders the tractor trailers 12, 20, 110 from their dry road platooning order to a wet road platooning order.

Another embodiment of the ordering method as described herein can include a threshold of 10%, a first tractor trailer 12 in the first position with a tread volumetric void percentage of 70%, a second tractor trailer 20 in the second position with a tread volumetric void percentage of 40%, and a third tractor trailer 110 in the last position with a tread volumetric void percentage of 50%. Since the difference of 30% between the first and second tractor trailers 12, 20 is over the 10% threshold the first tractor trailer 12 will be moved to the middle position and the second tractor trailer 20 that has the lower tread volumetric void percentage will be moved to the lead position. Next, the first tractor trailer 12 is compared to the third tractor trailer 110 and the 70% tread volumetric void volume is greater than the 50% tread volumetric void volume by over 10% so their positions are switched. As such, in this example the lead tractor trailer is the second tractor trailer 20 having a 40% tread volumetric void volume, the middle vehicle is the third tractor trailer 110 with a 50% tread volumetric void volume, and the last tractor trailer in the platoon 10 is the first tractor trailer 12 with a 70% tread volumetric void volume. Since the difference between the second and third tractor trailers 20, 110 is only 10% the difference does not exceed the 10% threshold and the positions of these two tractor trailers 20, 110 are not changed in the platoon 10.

The threshold can be set based upon the majority of the road surface the platoon is expected to drive upon. If the majority of the road surface is a high polished road surface the threshold may be 7%. If the majority of the road surface the platoon 10 will drive on is a higher frictional road surface such as asphalt, then the threshold can be higher and may be 10%. The threshold set can be from 7%-10% in accordance with various exemplary embodiments.

As previously mentioned, all of the examples and embodiments described herein can be qualified in that no change in position of a tractor trailer is executed if the wear is minimal from the new state such that only 12.5% or less tread volumetric void is lost. This was previously described as having the disclosed method only begin if none of the tractor trailers have an 87.5% or greater tread volumetric void volume.

Figure 5:
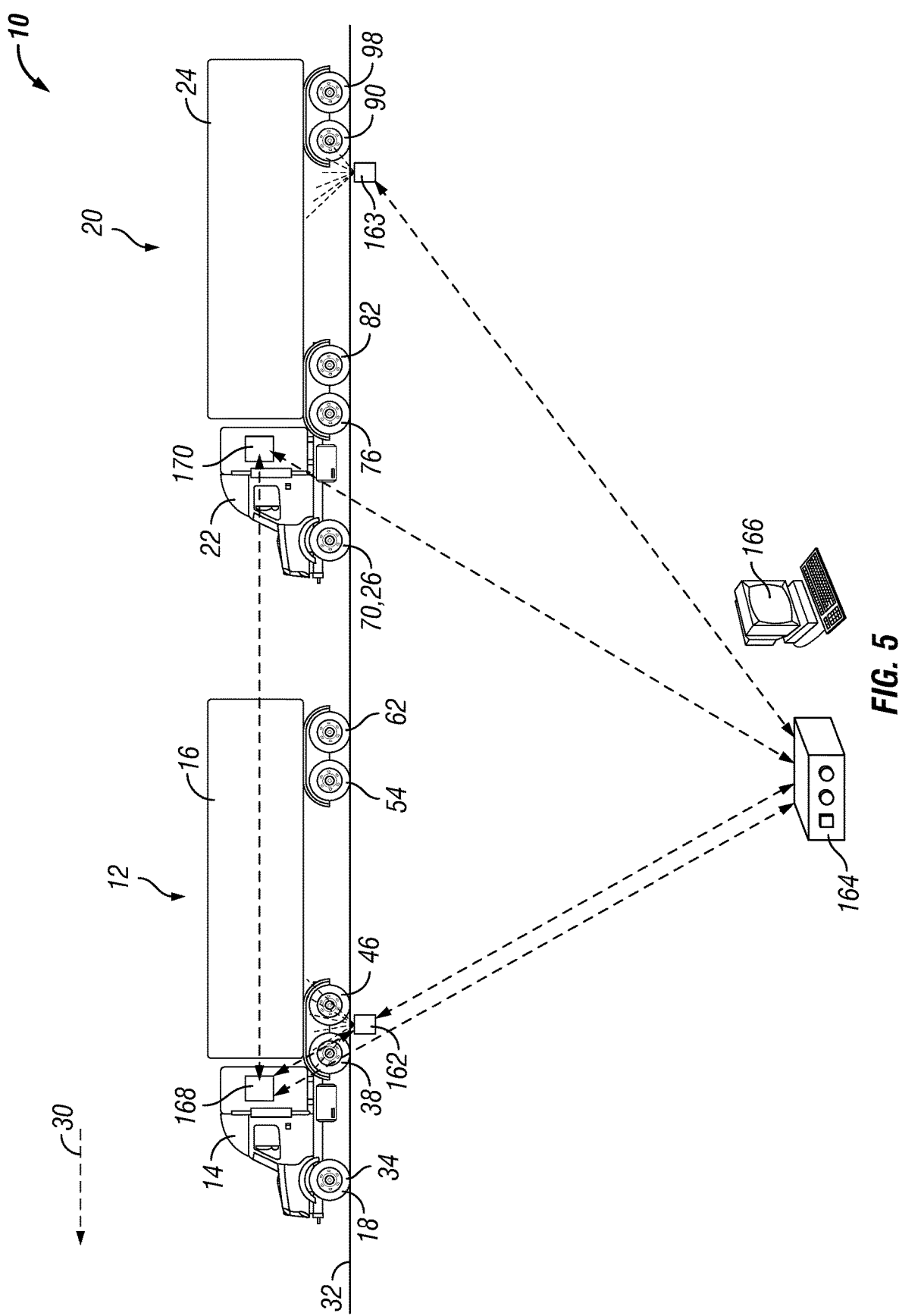
FIG. 5 is a side view of a platoon that also shows communication and driver assisting technology.

Another embodiment of the method is illustrated in FIG. 5 in which the platoon is made up of two tractor trailers 12 and 20. As discussed, any plurality of tractor trailers 12, 20 may be present in the platoon 10 in other embodiments. The platoon 10 includes the same tires as previously discussed and a repeat of this information is not necessary. Although each tractor trailer 12, 20 has eighteen tires other numbers are possible in other embodiments. There are tire sensors 162, 163 located near, on, or in the ground 32 onto which the tractor trailers 12, 20 run. The tire sensors 162, 163 study the tires of the tractor trailers 12, 20 and can sense the tread volumetric void or tread depth or other physical parameter of the tires. The tire sensors 162, 163 may be any sensor capable of sensing tread depth or tread volumetric void, and in some embodiments may be a ProTrak G high-resolution profiling sensor from MTI Instruments that is a laser sensor that use triangulation to render a two dimensional height profile of the surface of the tread which can lead to the building of a 3D image of the tread upon rotation of the tire. In other embodiments, the tire sensors 162, 163 could be GOCATOR® smart sensors that are non-contact 3D scanning sensors capable of providing tread depth or tread volumetric void data. A drive over sensor 162, 163 can be used in which the tractor trailers 12, 20, 110 drive over them and they record the tread depth, tread volumetric voids, or other desired tread information. The tire sensors 162, 163 could be mechanical devices that are put into grooves of the tread of the tires to measure tread depth. The tire sensors 162, 163 may be any device capable of measuring the depth and/or tread volumetric void of the tread of the tires. Although two tire sensors 162, 163 are shown, any number of tire sensors 162, 163 may be used to measure the tread volumetric void of the tread.

This information may be sent to transmitters 168, 170 carried by the tractor trailers 12, 20 of the convoy or can be sent to a processor 164 located in a location remote from the tractor trailers 12, 20 or in some instances within one or more of the tractor trailers 12, 20. The processor 164 can obtain the sensor 162, 163 data and use it with a stored database, if necessary, to ascertain the tread volumetric void percentage of the plurality of tires in the tractor trailers 12, 20 that are the subject of evaluation. The determination of the tread volumetric void percentage may be executed by the tire sensors 162, 163, or processor 164, or combinations thereof. The processor 164 may then perform the averaging calculation to determine average tread volumetric void percentages of the tires of the tractor trailers 12, 20. Once the averages are known, the processor 164 can then send instructions to the transmitters 168 and 170 to in turn inform the drivers and/or the automatic driving systems of the tractor trailers 12, 20 to reorder, or keep as the case may be, their positions in the platoon 10. Alternatively, the processor 164 may simply output this information to the display 166 and this information could be transmitted to drivers of the tractor trailers 12, 20 in any other manner. The processor 164 has a display 166 that can show the drivers or operators any of the aforementioned data or the calculated platoon 10 order. The processor 164 can send and receive signals to the tire sensors 162, 163 and the transmitters 168, 170, and the transmitters 168, 170 and send and receive signals to one another and to the tire sensors 162, 163. The transmitters 168 and 170 need not be in communication with one another in other embodiments. The processor 164 and tire sensors 162, 163 could be provided as a single unit, or they may be provided as more than one unit so that they are not both contained in the same device in accordance with different embodiments.

The processor 164 and transmitters 168, 170 can be provided by a variety of sources. For example, the transmitters 168, 170 could be in-vehicle computer systems supplied by Sintrones having offices located at 2F-3 No. 738, Zhongzheng Rd., New Taipei City 235, Taiwan. The processor 164 could be a laptop or desktop computer provided by any variety of companies. In other embodiments the transmitters 168, 170 could be Bluetooth enabled two way radios capable of receiving and transmitting cell phone data and one such type of transmitter could be a Rugged Radios RRP696 Black Out Series.

The method of ordering the tractor trailers in the platoon 10 can be executed by looking at all of the steer tires and drive tires and measuring the tread volumetric void percentages of all of them and taking an average of all of these tires and then comparing the average tread volumetric void percentages between the various tractor trailers 12, 20, 110 in the platoon 10. An alternative way of executing the method of ordering sees one measuring all of the tread volumetric void percentages of the steer tires and drive tires of the tractor trailer, but only considering the drive or steer tire that has the lowest tread volumetric void percentage and discounting all of the other tires of that particular tractor trailer 12, 20 or 110. The other tractor trailers 12, 20 or 110 are considered in a similar manner in which only the drive or steer tire having the lowest tread volumetric void percentage is counted and the rest are disregarded. The platooning order can be established for each one of the tractor trailers 12, 20, 110 based on the steer/drive tire of each one of the tractor trailers 12, 20, 110 that has the lowest tread volumetric void percentage irrespective of the tread volumetric void percentages of the remaining steer/drive tires of the tractor trailers 12, 20, 110.

Experiments Conducted in Support of the Disclosed Method

Applicant conducted experiments in order to determine whether tread volumetric void percentage was a proper metric to order tractor trailers 12, 20, 110 in the platoon 10 arrangement. The test track was wetted to have a water depth of 1.2 mm and test tracks with surfaces of different frictional coefficients were utilized. Surface A8 is a wet asphalt surface which has a different coefficient than surface A1 that is a wet polished concrete road surface. Testing on dry surfaces (dry asphalt C6) was also conducted in order to determine the effects of average tread volumetric void percentages on dry surfaces. For baseline measurements, the pressure of the tires was set at 6.9 bars. Baseline loading, different tire types, and different types of tractors 14 and trailers 16 used in the testing follow, and combinations of these different types of tractors 14 and trailers 16 were utilized.

Cummins® Tractor and Trailer:

| Tractor | 2020 International LT625 6 × 4 (LT62F) | Brake Package Air Disc Brakes (ADB) Bendix Spicer ADB22X ABS Bendix ABS (6S/6M) |
|---|---|---|
| Trailer | 2020 Great Dane CCC-3314-01053 | Brake Package Standard Drum Brakes Hendrickson HLX5 ABS Wabco (2S/1M) Easy Stop |

Michelin® Tractor and Trailer:

| Tractor | 2009 Freightliner Cascadia 72" raised roof | The brake system on this test vehicle is modified the following way in order to |
|---|---|---|
| Trailer | 2008 Utility Trailer Manufacturing Co. Model 4000D-X | maintain a stable braking condition and make reliable tire performance comparisons: The 2S/1M system on trailer ABS is replaced by 4S/2M system to prevent wheel locking and excessive tire wearing, Heavy grade drum brakes are used in all 10 wheel positions to prevent thermal brake fade. |

Loading in kilograms for baseline conditions:

| Tire | Axle | Left Side | Right Side | Axle Load | Total Load |
|---|---|---|---|---|---|
| Steer | 1 | 2600 | 2600 | 5200 | 33,200 |
| Drive | 2 | 3750 | 3750 | 15000 | |
|  | 3 | 3750 | 3750 | | |
| Trailer | 4 | 3250 | 3250 | 13000 | |
|  | 5 | 3250 | 3250 | | |

Michelin® tires used in various experiments:

| | State | Tire | Tire Tread Depth (mm) | Solid SRE (m3) | Void (m3) |
|---|---|---|---|---|---|
| Steer | Full TD | MI baseline steer tire | 17.5 | 6.47E−05 | 1.43E−05 |
| | ½ TD | MI baseline steer tire | 8.75 | 3.52E−05 | 4.32E−06 |
| | Worn | MI baseline steer tire | 4.1 | 1.80E−05 | 3.56E−06 |
| | Full TD | MI multi-steer | 16 | 1.20E−04 | 2.37E−05 |

|  | State | Tire | Tire Tread Depth (mm) | Solid SRE (m3) | Void (m3) |
|---|---|---|---|---|---|
|  | ½ TD | MI multi-steer | 8 | 6.31E−05 | 8.85E−06 |
|  | Worn | MI multi-steer | 4.1 | 3.03E−05 | 4.75E−06 |
|  | Full TD | MI long haul steer | 15 | 7.84E−05 | 1.39E−05 |
|  | ½ TD | MI long haul steer | 7.5 | 4.16E−05 | 4.52E−06 |
|  | Worn | MI long haul steer | 4.1 | 2.09E−05 | 3.03E−06 |
| Drive | Full TD | MI baseline drive tire | 23.55 | 3.49E−04 | 8.40E−05 |
|  | ½ TD | MI baseline drive tire | 11.775 | 1.88E−04 | 2.88E−05 |
|  | Worn | MI baseline drive tire | 4.1 | 6.39E−05 | 8.25E−06 |
|  | Full TD | MI long haul drive tire | 18.4 | 7.45E−05 | 2.19E−05 |
|  | ½ TD | MI long haul drive tire | 9.2 | 3.26E−05 | 1.56E−05 |
|  | Worn | MI long haul drive tire | 4.1 | 4.73E−06 | 1.58E−05 |
|  | Full TD | MI multi-drive tire | 19.4 | 3.24E−04 | 6.52E−05 |
|  | ½ TD | MI multi-drive tire | 9.7 | 1.65E−04 | 2.99E−05 |
|  | Worn | MI multi-drive tire | 4.1 | 6.27E−05 | 1.79E−05 |
| Trailer | Full TD | MI long haul trailer tire | 10 | 7.00E−05 | 1.43E−05 |
|  | ½ TD | MI long haul trailer tire | 5 | 3.64E−05 | 5.73E−06 |
|  | Worn | MI long haul trailer tire | 4.1 | 2.74E−05 | 5.56E−06 |
|  | Full TD | MI baseline trailer tire | 12.5 | 6.53E−05 | 1.32E−05 |
|  | ½ TD | MI baseline trailer tire | 6.25 | 3.55E−05 | 3.72E−06 |
|  | Worn | MI baseline trailer tire | 4.1 | 2.18E−05 | 2.57E−06 |

Baseline configuration for the tractor trailer 12 was set up using steer tires 34, 36 that were Michelin® 275/80R22.5 baseline steer tires; drive tires 38, 40, 42, 44, 46, 48, 50 and 52 that were Michelin® 275/80R22.5 baseline drive tires; and trailer tires 54, 56, 58, 60, 62, 64, 66 and 68 that were Michelin® 275/80R22.5 baseline trailer tires. One tractor trailer 12 configuration evaluated is known as the long haul (LH)/Energy Tire configuration and includes steer tires 34, 36 that are Michelin® 275/80R22.5 long haul steer tires, drive tires 38, 40, 42, 44, 46, 48, 50 and 52 that are Michelin® 275/80R22.5 multi-drive tires, and trailer tires 54, 56, 58, 60, 62, 64, 66 and 68 that are Michelin® 275/80R22.5 long haul trailer tires. Another tractor trailer 12 tire configuration evaluated in the experiments include steer tires 34, 36 that were Michelin® 275/80R22.5 multi-steer tires, drive tires 38, 40, 42, 44, 46, 48, 50 and 52 that were Michelin® 275/80R22.5 multi-drive tires, and trailer tires 54, 56, 58, 60, 62, 64, 66 and 68 that were Michelin® 275/80R22.5 long haul trailer tire which may be referred to as a multi tires configuration herein. An additional tractor trailer 12 tire configuration included steer tires 34, 36 that were Goodyear® 295/75R22.5 Endurance® LHS®, drive tires 38, 40, 42, 44, 46, 48, 50 and 52 that were Goodyear® 295/75R22.5 Endurance® LHD®, and trailer tires 54, 56, 58, 60, 62, 64, 66 and 68 that were Goodyear® 295/75R22.5 Fuel Max® LHT®.

Various tractor trailer 12 configurations were put together to evaluate the impact of a fully loaded trailer 16 versus a trailer 16 that is empty on stopping distance. Based upon the results of the test, it was discovered that load conditions have minimal impact (about 1-2%) on wet braking distance, while loading has a significant impact (about 19%) on dry braking distance with a fully loaded tractor trailer 12 taking much longer to stop.

| Load Effect (% LACCM) |  | A1 | A8 |  |
|---|---|---|---|---|
| Constant | Test Variable | (Wet) Set A | (Wet) Set A | C6 (Dry) Set A |
| Vehicle Config | Loaded | 100.0% | 100.0% | 100.0% |
| Vehicle Config | Empty | 97.8% | 100.7% | 119.3% |

Note:
Loaded Condition; Standard Pressure; Standard water depth; Cummins Tractor w/Michelin Trailer Another evaluation that was conducted was looking at the stopping distance between tractor trailers 12 that feature different combinations of the tractor 14 and the trailer 16. It was found that changing the vehicle configuration did impact some of the braking distance results, especially with the choice of tractor 14. The trailer 16 has a smaller impact than the tractor (about 3-5% as compared to 2-12%, respectively).

| Vehicle Effect (% LACCM) | | | | | |
|---|---|---|---|---|---|
| Test | | A1 | | A8 | |
| Constant | Variable | Cummins | Michelin | Cummins | Michelin |
| Cummins Tractor | Trailer | 94.7% | 100.0% | 97.1% | 100.0% |
| Michelin Trailer | Tractor | 100.0% | 97.9% | 100.0% | 88.4% |

Note:
Loaded Condition; Standard Pressure; Standard water depth

Tire pressure was also adjusted in some tests to see if the tire pressure had any impact on stopping distance. The configurations were standard tire pressure versus tire pressure that was reduced by 25%. It was discovered that decreasing tire pressure did not have a significant impact on braking distance in dry or wet conditions.

| Pressure Effect (% LACCM) | | A1 (Wet) | A8 (Wet) | C6 (Dry) |
|---|---|---|---|---|
| Constant | Test Variable | Set A | Set A | Set A |
| Vehicle Config | std. pressure | 100.0% | 100.0% | 100.0% |
| Vehicle Config | low pressure | 101.2% | 101.1% | 103.8% |

Note:
Loaded Condition; Standard water depth; Cummins Tractor w/Michelin Trailer Experiments were conducted on wet road surfaces to determine stopping distances based upon different types of tire on the tractor trailer 12. Goodyear® tires are worse with respect to stopping distance than any of the other tire combinations.

| Tire Effect (% LACCM) | A1 (Wet) | A8 (Wet) |
|---|---|---|
| Tire "Grouping" | Set A | Set A |
| Michelin (MI) Baseline Tires | 100.00% | 100.00% |
| MI Long Haul (LH)/Energy Tires | 99.5-100.4% | 100.5-100.6% |
| MI Multi Tires | 97.8-98.9% | 96.7-99.2% |
| Goodyear (GY) Comp Tires | 94.80% | 93.30% |

Note:
Loaded Condition; Standard Pressure; Standard water depth; Cummins Tractor w/Michelin Trailer It was discovered that the wear state of the tire, which is the usable amount of tread depth, had one of the largest impacts on stopping distance. The baseline set is the baseline set described above having brand new tires. Set B is the Goodyear® set as previously described, and set C is the Michelin® multi tires set previously described.

| | Tire Effect | | | | | |
|---|---|---|---|---|---|---|
| | A1 | | | A8 | | |
| Wear State | Set A = Baseline | Set B = LH | Set C = Multi | Set A = Baseline | Set B = LH | Set C = Multi |
| New | 100.00% | 99.5-100.4% | 97.8-98.9% | 100.00% | 100.5-100.6% | 96.7-99.2% |
| ½ worn | 85.00% | 85.10% | 78.30% | 94.50% | 93.80% | 92.90% |
| "Fully" worn | 59.30% | 64.00% | 51.30% | 84.70% | 81.20% | 77.30% |

Note:
Loaded Condition; Standard Pressure; Standard water depth; Cummins Tractor w/Michelin Trailer Road surface A1 has the lowest coefficient of friction and shows the biggest change in braking performance. The change in tread depth shows the greatest on this surface A1. The A8 results are more representative of tread sculpture and material impact on braking traction, and this test surface also shows a significant impact on braking results as tread depths are reduced.

The various experimental tests were conducted and are presented in the below table that include percentages of different relative performances. The percentages indicated represent the difference between the test minus the control. If the percentage is a negative value, then the control variable outperforms the test variable, and if the percentage is a positive value then the test variable outperforms the control variable in that category.

| Control Variable | vs. | Test Variable | A1 | A8 | C6 |
|---|---|---|---|---|---|
| Modified Trailer ABS | — | Standard Trailer ABS | −5.30% | −2.90% | |
| Standard Tire Pressures | — | 25% Lower Tire Pressures | 1.20% | 1.10% | 3.8%, −1.7% |
| Fully Loaded Trailer | — | Empty Trailer | −2.20% | 0.70% | 19.30% |
| Reference Trailer Set | — | Different Trailer Set | −0.60% | −1.10% | |
| Standard Load + Load Placement | — | Shifted Load | 3.00% | −5.00% | |
| Disk Brake Tractor | — | Drum Brake Tractor | −2.10% | −11.60% | |
| Michelin Regional | — | Michelin Long Haul | −0.50% | 0.50% | |
| Michelin Regional | — | Michelin Multi | −1.10% | −3.30% | |
| Michelin Regional | — | Goodyear | −5.20% | −6.70% | |
| Michelin Long Haul-New | — | Michelin Long Haul-Half Worn | −15.30% | −6.30% | |
| Michelin Regional-New | — | Michelin Regional-Half Worn | −15% | −5.50% | |
| Michelin Multi-New | — | Michelin Multi-Half Worn | −19.50% | −6.30% | |
| Michelin Long Haul-New | — | Michelin Long Haul-Full Worn | −36.40% | −18.90% | |
| Michelin Regional-New | — | Michelin Regional-Full Worn | −40.70% | −15.30% | |
| Michelin Multi-New | — | Michelin Multi-Full Worn | −46.50% | −21.90% | |

The conducted experiments disclose that tire wear state has the biggest impact on stopping distance for wet braking. Worn tires have a significantly different performance than new tires. Half worn tires have a statistically different response (15-20% on A1, and about 6% on A8) with significantly larger stopping distances than new tires. Worn out tires have an almost 50% (36-47% on A1, and 15-22% on A8) longer stopping distance. The lower the surface friction the bigger the impact on tread depth/wear state. Vehicle loading has a big impact on dry road conditions, but minimal impact when on wet roads. The vehicle's tractor/trailer brake system does appear to have an impact when tested on A8 surfaces. There is not a large variation in the selection of tire design with the exception that Goodyear® tires performed slightly worse. Tire pressure does not have an impact on wet or dry braking performance.

The tread volumetric void volume has the greatest impact on stopping performance in wet conditions. The wear state of the tires is related to the tread volumetric void volume and can be used to measure this property. Tractor brake type, trailer ABS configuration, and load distributions also had a noticeable impact on wet braking. The platooning arrangement may be ordered so that only tire tread volumetric void volume is considered when making the selection because it is the primary driver, especially in the worn condition. The ordering method may be selected so that no other property is considered when making the platoon ordering except for the tread volumetric void percentages of some of the tractor 14, 22, 112 tires 18, 26, 116 and none of the tires of the trailers 16, 24, 114.

Applicant has discovered through the experimental data obtained in testing that the steer tires should be weighed more heavily than the drive tires. A weighting ratio of is optimal, but any weighting ratio that is 80/20 or higher (steer tire 80-100, and drive tire 0-20) is possible in the method. If using a 100/0 weighting, none of the tread volumetric void of the drive tires is considered and only the steer tire tread volumetric void is used. The method may look at all of the steer tires, and all of the drive tires, or any number of these tires. If only a single one of the drive or steer tires is considered, it is preferable to use the single drive tire with the lowest tread volumetric void, and the steer tire with the lowest tread volumetric void. Once the tread volumetric void of the steer tires and drive tires is ascertained through averaging or otherwise, the weighting is applied and the numbers added together to arrive at the tread volumetric void percentage of that tractor trailer 12, 20, or 110. The platoon 10 order for wet road surfaces may be set using these tread volumetric void percentages of the tractor trailers 12, 20, or 110 so long as a certain amount of different, for example 7% or larger, is present. If none of the tread volumetric void percentages are different from one another by at least 7% then there is no reordering in the platoon 10. The method described herein can be executed before the platoon 10 is expected to be in wet road conditions and once the platoon 10 reaches the wet road conditions the tractor trailers 12, 20, 110 can be reordered based upon the disclosed method.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A method for platooning tractor trailers on wet road surfaces, comprising:
    providing a first tractor trailer that has a first tractor and a first trailer, wherein the first tractor has a plurality of first tractor tires located on the first tractor that are first tractor steer tires and first tractor drive tires;
    providing a second tractor trailer that has a second tractor and a second trailer, wherein the second tractor has a plurality of second tractor tires located on the second tractor that are second tractor steer tires and second tractor drive tires;
    providing at least one tire sensor;
    measuring the plurality of first tractor tires and measuring the plurality of second tractor tires with the at least one tire sensor;
    providing a processor that receives data from the at least one tire sensor;
    determining a tread volumetric void percentage of each one of the plurality of first tractor tires via the data provided by the at least one tire sensor and weighting the tread volumetric void percentage of the first tractor steer tire(s) more heavily than the tread volumetric void percentage of the first tractor drive tire(s) to determine a tread volumetric void percentage of the first tractor trailer;
    wherein the weighting of the tread volumetric void percentage of first tractor steer tire(s) is at least 80% and the tread volumetric void percentage of first tractor drive tire(s) is no more than 20%;
    determining a tread volumetric void percentage of each one of the plurality of second tractor tires via the data provided by the at least one tire sensor and weighting the tread volumetric void percentage of the second tractor steer tire(s) more heavily than the tread volumetric void percentage of the second tractor drive tire(s) to determine a tread volumetric void percentage of the second tractor trailer;
    wherein the weighting of the tread volumetric void percentage of the second tractor steer tire(s) is at least 80% and the tread volumetric void percentage of the second tractor drive tire(s) is no more than 20%;
    wherein the processor sends instructions to automatic driving systems of the first tractor trailer and the second tractor trailer to move the first tractor trailer and the second tractor trailer to effect reordering of the first tractor trailer and the second tractor trailer in a platoon for driving on a wet road surface such that the first or second tractor trailer that has a lower tread volumetric void percentage is reordered in front of the first or second tractor trailer that has a higher tread volumetric void percentage if the difference between the tread volumetric void percentage of the first tractor trailer and the tread volumetric void percentage of the second tractor trailer is at least 7%.

2. The method as set forth in claim 1, wherein the weighting of the tread volumetric void percentage of first tractor steer tire(s) is 95% and the tread volumetric void percentage of first tractor drive tire(s) is 5%; and
    wherein the weighting of the tread volumetric void percentage of the second tractor steer tire(s) is 95% and the tread volumetric void percentage of the second tractor drive tire(s) is 5%.

3. The method as set forth in claim 1, wherein all of the tread volumetric void percentages of all of the first tractor steer tires and all of the tread volumetric void percentages of all of the first tractor drive tires are weighted and used to determine the tread volumetric void percentage of the first tractor trailer; and wherein all of the tread volumetric void percentages of all of the second tractor steer tires and all of the tread volumetric void percentages of all of the second tractor drive tires are weighed and used to determine the tread volumetric void percentage of the second tractor trailer.

4. The method as set forth in claim 1, wherein the tread volumetric void percentages of each one of the plurality of first tractor tires are determined by using an amount of wear each one of the plurality of first tractor tires have from unworn states of each one of the plurality of first tractor tires; and wherein the tread volumetric void percentages of each one of the plurality of second tractor tires are determined by using an amount of wear each one of the plurality of second tractor tires have from unworn states of each one of the plurality of second tractor tires.

5. The method as set forth in claim 1, wherein the tread volumetric void percentages of each one of the plurality of first tractor tires are determined by using an amount of tread life remaining on each one of the plurality of first tractor tires; and wherein the tread volumetric void percentages of each one of the plurality of second tractor tires are determined by using an amount of tread life remaining on each one of the plurality of second tractor tires.

6. The method as set forth in claim 1, wherein the tread volumetric void percentages of each one of the plurality of first tractor tires are determined by comparing an amount of void in each one of the treads of the plurality of first tractor tires in a new state to an amount of void in each one of the treads of the plurality of first tractor tires in a present state;

wherein the tread volumetric void percentages of each one of the plurality of second tractor tires are determined by comparing an amount of void in each one of the treads of the plurality of second tractor tires in a new state to an amount of void in each one of the treads of the plurality of second tractor tires in a present state.

7. The method as set forth in claim 1, further comprising:
providing a third tractor trailer that has a third tractor and a third trailer, wherein the third tractor has a plurality of third tractor tires located on the third tractor that are third tractor drive tires and third tractor steer tires;

determining a tread volumetric void percentage of each one of the plurality of third tractor tires via the data provided by the at least one tire sensor and weighting the tread volumetric void percentage of the third tractor steer tire(s) more heavily than the tread volumetric void percentage of the third tractor drive tire(s) to determine a tread volumetric void percentage of the third tractor trailer;

wherein the weighting of the tread volumetric void percentage of the third tractor steer tire(s) is at least 80% and the tread volumetric void percentage of the third tractor drive tire(s) is no more than 20%;

reordering the third tractor trailer in the platoon such that the third or first tractor trailer that has the lower tread volumetric void percentage is positioned in front of the third or first tractor trailer that has the higher average tread volumetric void percentage if the difference between the tread volumetric void percentage of the first tractor trailer and the tread volumetric void percentage of the third tractor trailer is at least 7%; and reordering the third tractor trailer in the platoon such that the third or second tractor trailer that has the lower tread volumetric void percentage is positioned in front of the third or second tractor trailer that has the higher tread volumetric void percentage if the difference between the tread volumetric void percentage of the second tractor trailer and the tread volumetric void percentage of the third tractor trailer is at least 7%.

8. The method as set forth in claim 1, wherein weight is not used to determine the order of the first tractor trailer and the second tractor trailer in the platoon.

9. The method as set forth in claim 1, wherein brake system performance is not used to determine the order of the first tractor trailer and the second tractor trailer in the platoon.

10. The method as set forth in claim 1, wherein determining the tread volumetric void percentage of each one of the plurality of first tractor tires is executed by the processor, and wherein determining the tread volumetric void percentage of each one of the plurality of second tractor tires is executed by the processor, and wherein the processor communicates the reordering of the first tractor trailer and the second tractor trailer in the platoon.

11. The method as set forth in claim 1, wherein the first tractor trailer and the second tractor trailer are only reordered when the tread volumetric void percentage of the first tractor trailer is 87.5% or less and when the tread volumetric void percentage of the second tractor trailer is 87.5% or less.

12. The method as set forth in claim 1, wherein the tread volumetric void percentage of the first tractor trailer is determined by the processor by averaging the tread volumetric void percentages of a plurality of the first tractor drive tires and then weighting, and by averaging the tread volumetric void percentages of a plurality of the first tractor steer tires and then weighting, and then adding together the weighted tread volumetric void percentage of the first tractor drive tires and the weighted tread volumetric void percentage of the first tractor steer tires; and wherein the tread volumetric void percentage of the second tractor trailer is determined by the processor by averaging the tread volumetric void percentages of a plurality of the second tractor drive tires and then weighting, and by averaging the tread volumetric void percentages of a plurality of the second tractor steer tires and then weighting, and then adding together the weighted tread volumetric void percentage of the second tractor drive tires and the weighted tread volumetric void percentage of the second tractor steer tires.

13. The method as set forth in claim 1, wherein the tread volumetric void percentage of the first tractor trailer is determined by the processor by weighting the lowest tread volumetric void percentage of any one of the first tractor steer tires and by weighting the lowest tread volumetric void percentage of any one of the first tractor drive tires, and then adding together the weighted tread volumetric void percentages of the first tractor drive tires and first tractor steer tires;

wherein the tread volumetric void percentage of the second tractor trailer is determined by the processor by weighting the lowest tread volumetric void percentage of any one of the second tractor steer tires and by weighting the lowest tread volumetric void percentage of any one of the second tractor drive tires, and then adding together the weighted tread volumetric void percentages of the second tractor drive tires and second tractor steer tires.

14. The method as set forth in claim 1, wherein the reordering of the first tractor trailer and the second tractor trailer in the platoon takes places only if the difference between the tread volumetric void percentage of the first tractor trailer and the tread volumetric void percentage of the second tractor trailer is at least 10%.

15. A tractor trailer platooning system, comprising:
- a first tractor trailer that has a first tractor and a first trailer, wherein the first tractor has a plurality of first tractor tires located on the first tractor that are first tractor steer tires and first tractor drive tires;
- a second tractor trailer that has a second tractor and a second trailer, wherein the second tractor has a plurality of second tractor tires located on the second tractor that are second tractor steer tires and second tractor drive tires;
- at least one tire sensor, wherein the at least one tire sensor is configured for measuring the plurality of first tractor tires and the plurality of second tractor tires;
- a processor that receives data from the at least one tire sensor;
- wherein the processor determines a tread volumetric void percentage of each one of the plurality of first tractor tires via the data provided by the at least one tire sensor by weighting the tread volumetric void percentage of the first tractor steer tire(s) more heavily than the tread volumetric void percentage of the first tractor drive tire(s) to determine a tread volumetric void percentage of the first tractor trailer;
- wherein the weighting of the tread volumetric void percentage of first tractor steer tire(s) is at least 80% and the tread volumetric void percentage of first tractor drive tire(s) is no more than 20%;
- wherein the processor determines a tread volumetric void percentage of each one of the plurality of second tractor tires via the data provided by the at least one tire sensor by weighting the tread volumetric void percentage of the second tractor steer tire(s) more heavily than the tread volumetric void percentage of the second tractor drive tire(s) to determine a tread volumetric void percentage of the second tractor trailer;
- wherein the weighting of the tread volumetric void percentage of the second tractor steer tire(s) is at least 80% and the tread volumetric void percentage of the second tractor drive tire(s) is no more than 20%;
- wherein the processor sends instructions to automatic driving systems of the first tractor trailer and the second tractor trailer to move the first tractor trailer and the second tractor trailer to effect reordering the first and second tractor trailers in a platoon such that the first or second tractor trailer that has a lower tread volumetric void percentage is positioned in front of the first or second tractor trailer that has a higher tread volumetric void percentage if the difference between the tread volumetric void percentage of the first tractor trailer and the tread volumetric void percentage of the second tractor trailer is at least 7%.

\* \* \* \* \*